United States Patent
Tanaka

(10) Patent No.: US 6,584,200 B1
(45) Date of Patent: Jun. 24, 2003

(54) IMAGE SCRAMBLING METHOD AND APPARATUS THEREFOR

(75) Inventor: Kazuyoshi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/286,071

(22) Filed: Apr. 5, 1999

(30) Foreign Application Priority Data

Apr. 8, 1998 (JP) ............................................ 10-095797

(51) Int. Cl.[7] .................................................. G06F 1/24
(52) U.S. Cl. ........................ 380/216; 713/160; 713/189; 713/200; 713/201
(58) Field of Search ................................. 713/160, 189, 713/193, 200, 201; 380/216

(56) References Cited

U.S. PATENT DOCUMENTS

| | | | |
|---|---|---|---|
| 5,177,485 A | 1/1993 | Daniel et al. | |
| 5,583,941 A | 12/1996 | Yoshida et al. | |
| 6,064,748 A | * 5/2000 | Hogan | ........................ 348/461 |
| 6,160,889 A | * 12/2000 | Yagasaki | ..................... 380/210 |
| 6,314,188 B1 | * 11/2001 | Ishibashi | ..................... 380/201 |

FOREIGN PATENT DOCUMENTS

| | | |
|---|---|---|
| EP | 0 613 301 A2 | 8/1994 |
| EP | 0 641 130 A1 | 3/1995 |
| EP | 0 674 440 A2 | 9/1995 |
| JP | 7-30855 | 1/1995 |
| JP | 7-67096 | 3/1995 |
| JP | 7-135648 | 5/1995 |
| JP | 8-9359 | 1/1996 |
| JP | 8-102949 | 4/1996 |
| JP | 8-181967 | 7/1996 |
| JP | 9-27950 | 1/1997 |
| JP | 9-214930 | 8/1997 |
| JP | 10-13827 | 1/1998 |
| JP | 10-13828 | 1/1998 |

* cited by examiner

*Primary Examiner*—Thomas R. Peeso
(74) *Attorney, Agent, or Firm*—Scully Scott Murphy & Presser

(57) ABSTRACT

The present invention relates to an image scrambling method and apparatus. The apparatus comprises a first dividing decoder for dividing the MPEG encoded image data stream into a plurality of data segments (for example, macro blocks or slices); at least one arrangement table recording arrangement information to be used for arranging the data segments; an arrangement circuit for arranging the data segments output from the first dividing decoder in accordance with the information recorded in the arrangement table to output a scrambled image data stream; a second dividing decoder for dividing the scrambled image data stream into a plurality of data segments; at least one rearrangement table recording rearrangement information to be used for rearranging the data segments output from the second dividing decoder; and a rearrangement circuit for rearranging the data segments output from the second dividing decoder in accordance with the rearrangement information recorded in the rearrangement table.

12 Claims, 14 Drawing Sheets

Fig. 5

BEFORE SCRAMBLING

| SLICE HEADER | MB #1 | MB #2 | ... | MB #(n-1) | MB #n |

| SLICE HEADER | MB #(n+1) | MB #(n+2) | ... | MB #(2n-1) | MB #(2n) |

AFTER SCRAMBLING

| SLICE HEADER | MB #(n+2) | MB #(n-1) | ... | MB #(2n) | MB #n |

| SLICE HEADER | MB #(n+1) | MB #1 | ... | MB #(2n-1) | MB #2 |

MB: MACRO BLOCK

Fig.6
BEFORE SCRAMBLING
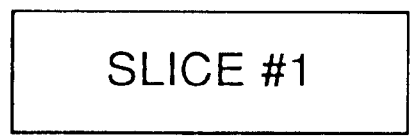
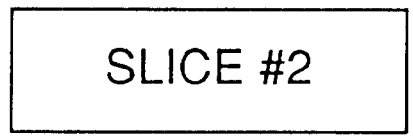
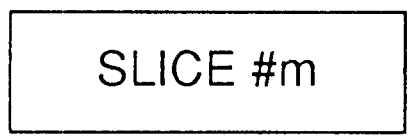
AFTER SCRAMBLING
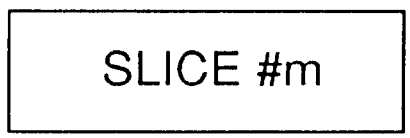
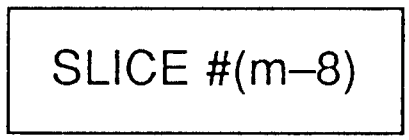
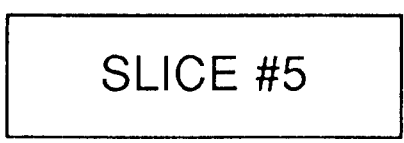

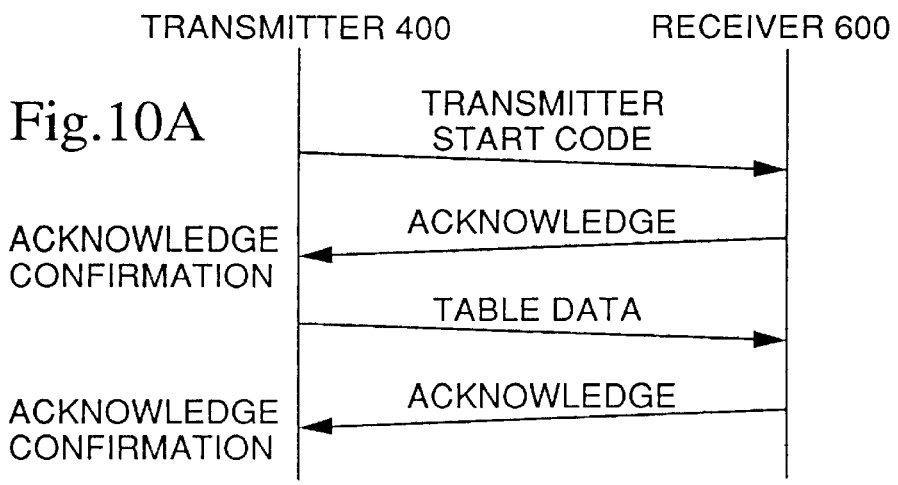
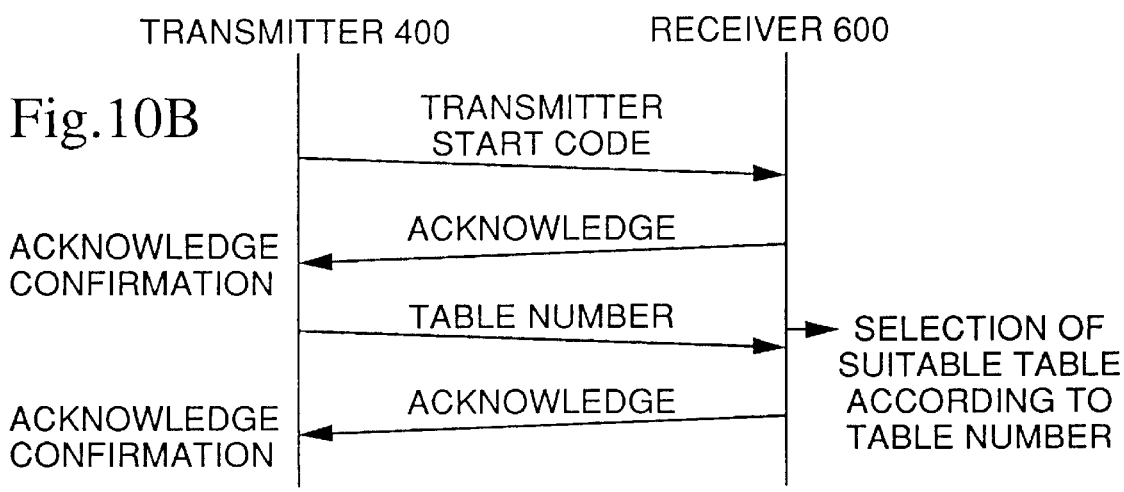
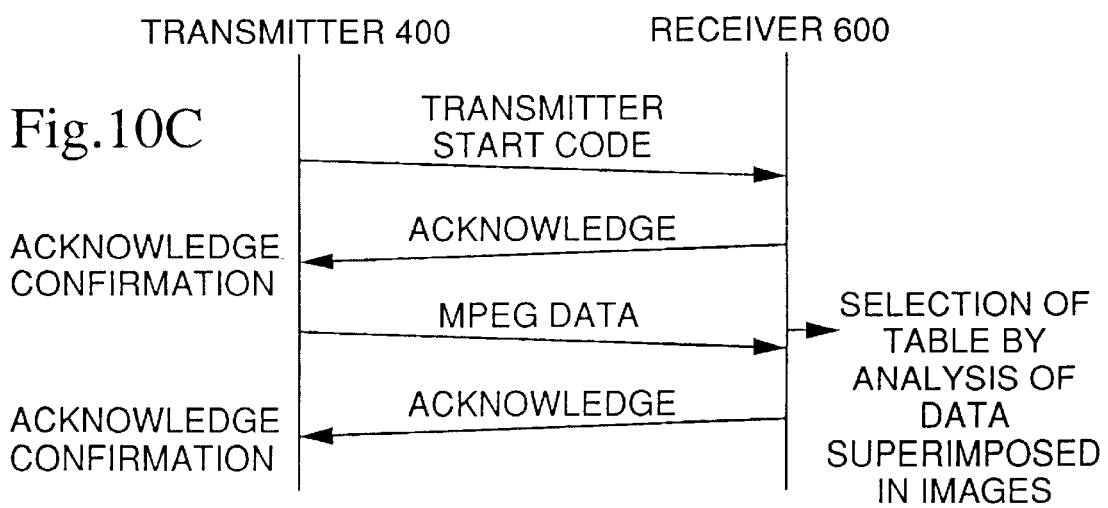

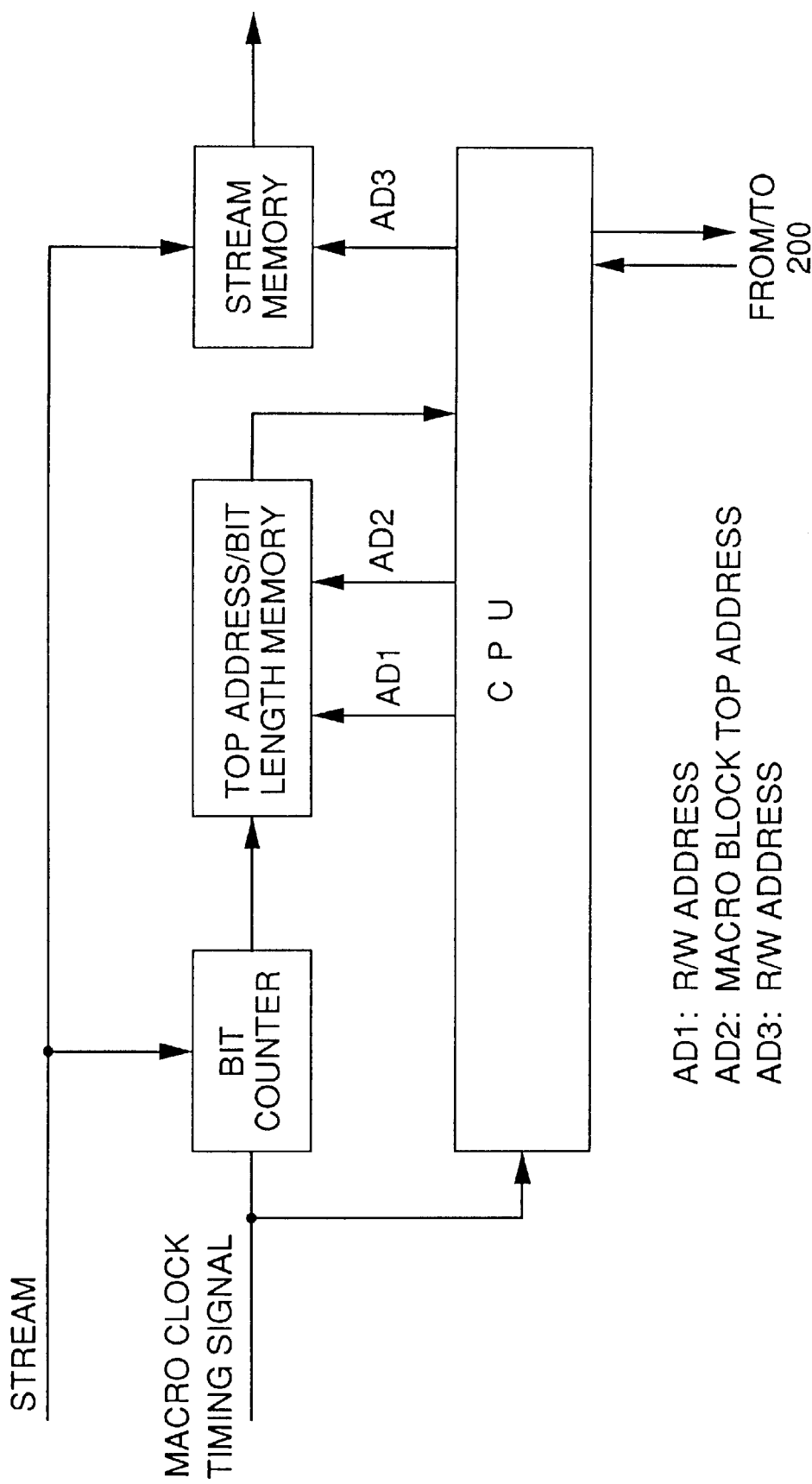

IMAGE SCRAMBLING METHOD AND APPARATUS THEREFOR

BACKGROUND OF THE INVENTION

1. Field of the Invention

This invention relates to a method and apparatus for scrambling and unscrambling of image data using an MPEG encoding digital video system.

2. Background Art

In previous methods for scrambling of MPEG encoded images, the MPEG encoded video data are scrambled by disassembling the data into bit units and reassembling the disassembled data using an algorithm which has no relation to the MPEG encoded images itself. Therefore, the image data scrambled by this method becomes completely non viewable.

However, the MPEG decoding system does not recognize the image data scrambled by the above method as video data which are encoded by MPEG standards, and the risk arises that the MPEG decoder will malfunction or will be broken down when the scrambled data are input.

Furthermore, because the image data scrambled by the above method is completely non viewable before the unscrambling of the data, even users having permission to unscramble the scrambled data cannot recognize whether the receiving data are the scrambled video data or mere noise. Therefore, unless the sender of the scrambled data informs the receiver that scrambled data are being transmitted, the receiver cannot unscramble the transmitted data to see the original image data.

In order to solve the above problems, in the method for disassembling video data into bit units and reassembling using an algorithm having no relation to the MPEG encoded video data, it is effective to leave part of the image data stream unscrambled, while scrambling the remaining part. In this case, since the partly scrambled data complies with the MPEG standards, a malfunction or the brake-down of the decoding system can be avoided; furthermore, the receiver can easily recognize that the receiving data is scrambled image data.

However, because the above method leaves part of the image data in a visible state, it is far from a complete scrambling of the image data. Additionally, the selection of the part to be visible should be entrusted to the copyright holder of the image data to be scrambled.

SUMMARY OF THE INVENTION

It is therefore an object of the present invention to scramble an MPEG encoded image stream so that the scrambled data stream will comply with MPEG standards and an MPEG decoder will not malfunction or be broken down when scrambled data are input. It is another object of the present invention to scramble an MPEG encoded image stream so that user receiving the scrambled data can distinguish the scrambled data from mere noise. It is further another object of the present invention to enable the scrambling and unscrambling with simple circuits and at a low cost.

In order to accomplish the above objects, the image scrambling apparatus of the present invention comprises:

a first dividing decoder for dividing an MPEG encoded image data stream into a plurality of data segments;

at least one arrangement table recording arrangement information to be used for arranging the data segments;

an arrangement circuit for arranging the data segments output from the first dividing decoder in accordance with the information recorded in the arrangement table to output a scrambled image data stream;

a second dividing decoder for dividing the scrambled image data stream into a plurality of data segments;

at least one rearrangement table recording rearrangement information to be used for rearranging the data segments output from the second dividing decoder; and a rearrangement circuit for rearranging the data segments output from the second dividing decoder in accordance with the rearrangement information recorded in the rearrangement table.

The first dividing decoder, the arrangement table, and the arrangement circuit may be included in a transmitter, and the second dividing decoder, the rearrangement table, and the rearrangement circuit may be included in a receiver. However, the present invention is not limited to this construction, and all features may be contained in an apparatus or a system.

According to this scrambling apparatus, the scrambled image data consists of data segments each of which complies with MPEG standards, and the scrambled imaged data itself also complies with the MPEG standards. Therefore, an MPEG decoder receiving the scrambled data will not malfunction or be broken down.

Furthermore, although the scrambled image data is non viewable, because the image replayed from the scrambled image data exhibits a characteristic pattern which is different from that replayed from mere noise, users can easily distinguish the scrambled image data from mere noise. Additionally, digital processing for dividing and arranging the image data stream is simple, and it is possible to simplify the circuit for the scrambling and unscrambling.

In the scrambling apparatus of the present invention, the first and second dividing decoder may divide the data stream into macro blocks or slices as the data segments. As shown in FIG. 7, an MPEG encoded image data stream consists of a plurality of slices, and each slice consists of a plurality of macro blocks. In the general MPEG standards, each macro block consists of 16×16 pixels; however, the macro block to be used in the present invention is not limited to this size.

By dividing an MPEG encoded image data stream into a plurality of macro blocks and arranging the macro blocks so that each macro block is positioned at a position different from its original position in the data stream, it becomes impossible for an MPEG decoder to replay the image, even though the MPEG decoder will not malfunction and will not be broken down. The same effects can be obtained when dividing the image data stream into slices.

The scrambling apparatus of the present invention may comprise a table transmitter and a table receiver. The table transmitter transmits the arrangement information recorded in the arrangement table to the table receiver, and the table receiver calculates the rearrangement information from the arrangement information and records the rearrangement information in the rearrangement table. In this case, it is easy to use various arrangement tables without complicated operations at the receiver side.

The scrambling apparatus may include a plurality of arrangement tables respectively recording various arrangement information different from each other and having table numbers different from each other. In this case, the table transmitter transmits to the table receiver only the table number corresponding to the arrangement table to be used. Next, the table receiver calculates the rearrangement information from the arrangement information recorded in the arrangement table corresponding to the received table number, and records the rearrangement information in the rearrangement table.

Another aspect of the present invention is an image scrambling method for scrambling an MPEG encoded image data stream, and this method comprises the steps of:

provide an arrangement table recording arrangement information to be used;

dividing the MPEG encoded image data stream into a plurality of data segments; and arranging the data segments in accordance with the information recorded in the arrangement table to output a scrambled image data stream.

Another aspect of the present invention is an image unscrambling method for unscrambling an image data stream scrambled by the above scrambling method, and this method comprises the steps of:

dividing the scrambled image data stream into a plurality of data segments;

providing a rearrangement table recording rearrangement information to be used for rearranging the data segments; and rearranging the data segments in accordance with the information recorded in the rearrangement table to output an unscrambled image data stream.

Another aspect of the present invention is a computer-readable medium containing computer-readable instructions, and this medium comprises:

means for causing a computer to provide an arrangement table recording arrangement information to be used;

means for causing a computer to divide an MPEG encoded image data stream into a plurality of data segments; and means for causing a computer to arrange the data segments in accordance with the arrangement information recorded in the arrangement table to output a scrambled image data stream.

Another aspect of the present invention is a computer-readable medium containing computer-readable instructions, and this medium comprises:

means for causing a computer to divide a scrambled image data stream into a plurality of data segments;

means for causing a computer to provide a rearrangement table recording rearrangement information to be used for rearranging the data segments; and means for causing a computer to rearrange the data segments in accordance with the rearrangement information recorded in the rearrangement table to output an unscrambled image data stream.

Each of the above aspects of the invention can accomplish the objects as described.

BRIEF DESCRIPTION OF THE DRAWINGS

FIG. 5 illustrates an example of the original MPEG image data stream and the scrambled data stream scrambled by the first embodiment.

FIG. 6 illustrates an example of the original MPEG image data stream and the scrambled data stream scrambled by the third embodiment.

FIGS. 10A, 10B, and 10C respectively illustrate examples of the transmitting protocol which can be employed in the present invention.

FIG. 11 is a block diagram of an example of the arrangement circuit which can be employed in the first embodiment.

DETAILED DESCRIPTION OF THE PREFERRED EMBODIMENTS

[First Embodiment]

Figure 1:
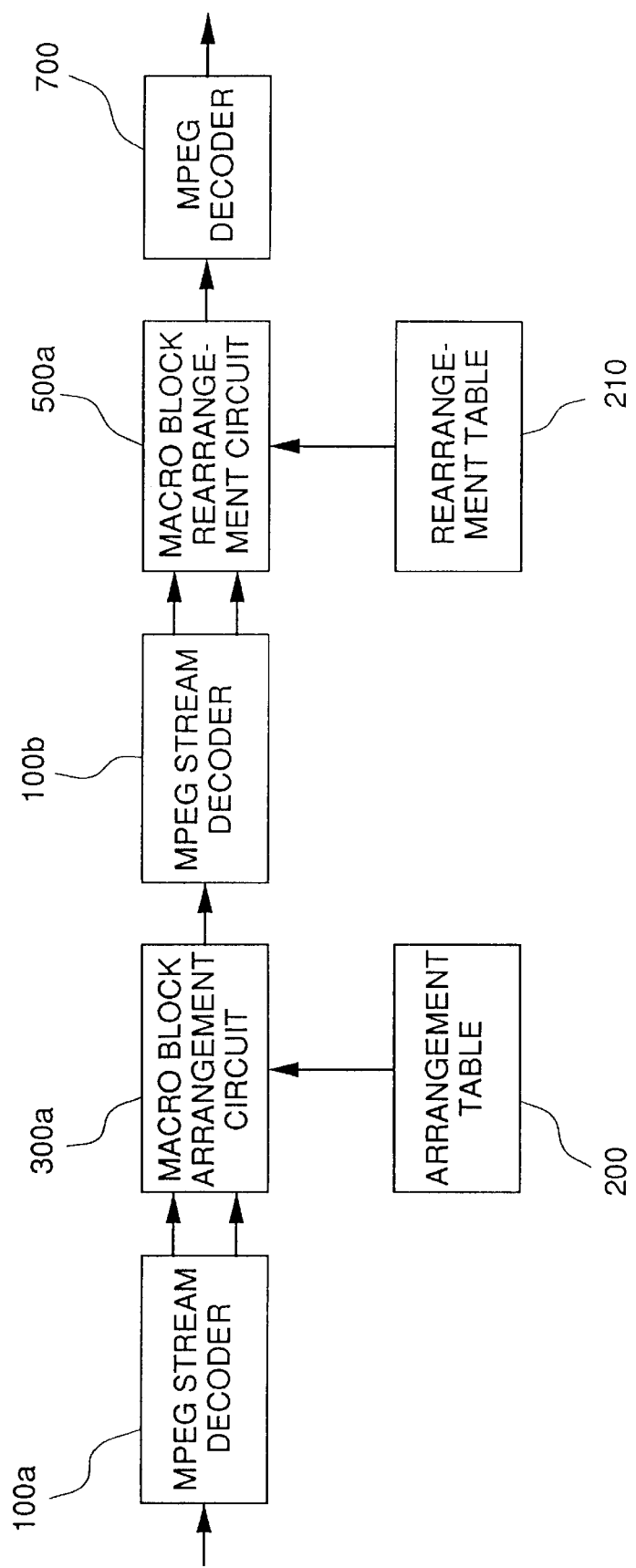
FIG. 1 is a block diagram of the image scrambling apparatus according to the first embodiment of the present invention.

FIG. 1 is a block diagram illustrating the best mode of the first embodiment of the scrambling apparatus of the present invention, and this apparatus consists of a transmitter (or a transmitting system) for scrambling an MPEG-encoded image data stream, and a receiver (or a receiving system) for unscrambling the scrambled image data stream.

The transmitter comprises an MPEG stream decoder 100a as a first dividing decoder for dividing an MPEG encoded image data stream into a plurality of data segments, an arrangement table 200 recording arrangement information to be used for arranging the data segments, and a macro block arrangement circuit 300a as an arrangement circuit for arranging the data segments output from the MPEG stream decoder 100a in accordance with the arrangement information recorded in the arrangement table 200 to output a scrambled image data stream.

The receiver comprises an MPEG stream decoder 100b as a second dividing decoder for dividing the scrambled image data stream into a plurality of data segments, a rearrangement table 210 recording rearrangement information to be used for rearranging the data segments output from the MPEG stream decoder 100b, a macro block rearrangement circuit 500b as a rearrangement circuit for rearranging the data segments output from the MPEG stream decoder 100b in accordance with the rearrangement information recorded in the rearrangement table 210, and an MPEG decoder 700 for decoding the rearranged MPEG image data stream to reproduce the original image data.

In the transmitter of the present embodiment, the MPEG stream decoder 100a receives, from an MPEG encoded data source (not shown), an MPEG encoded data stream produced by MPEG-encoding an image data stream, detects the top position of each of the macro blocks included in the MPEG encoded data stream by decoding the data stream using a macro block as a unit, and outputs timing signals so as to synchronize with the data stream. The macro block arrangement circuit 300a receives both the MPEG encoded data stream and the timing signals, arranges the data segments divided by the timing signal in accordance with the arrangement information, for example, as shown in FIG. 5, and outputs a scrambled image data stream. The bit length of each of the macro blocks is not constant; however, in FIG. 5, the macro blocks are simply illustrated as if they have a constant length.

Figure 8:
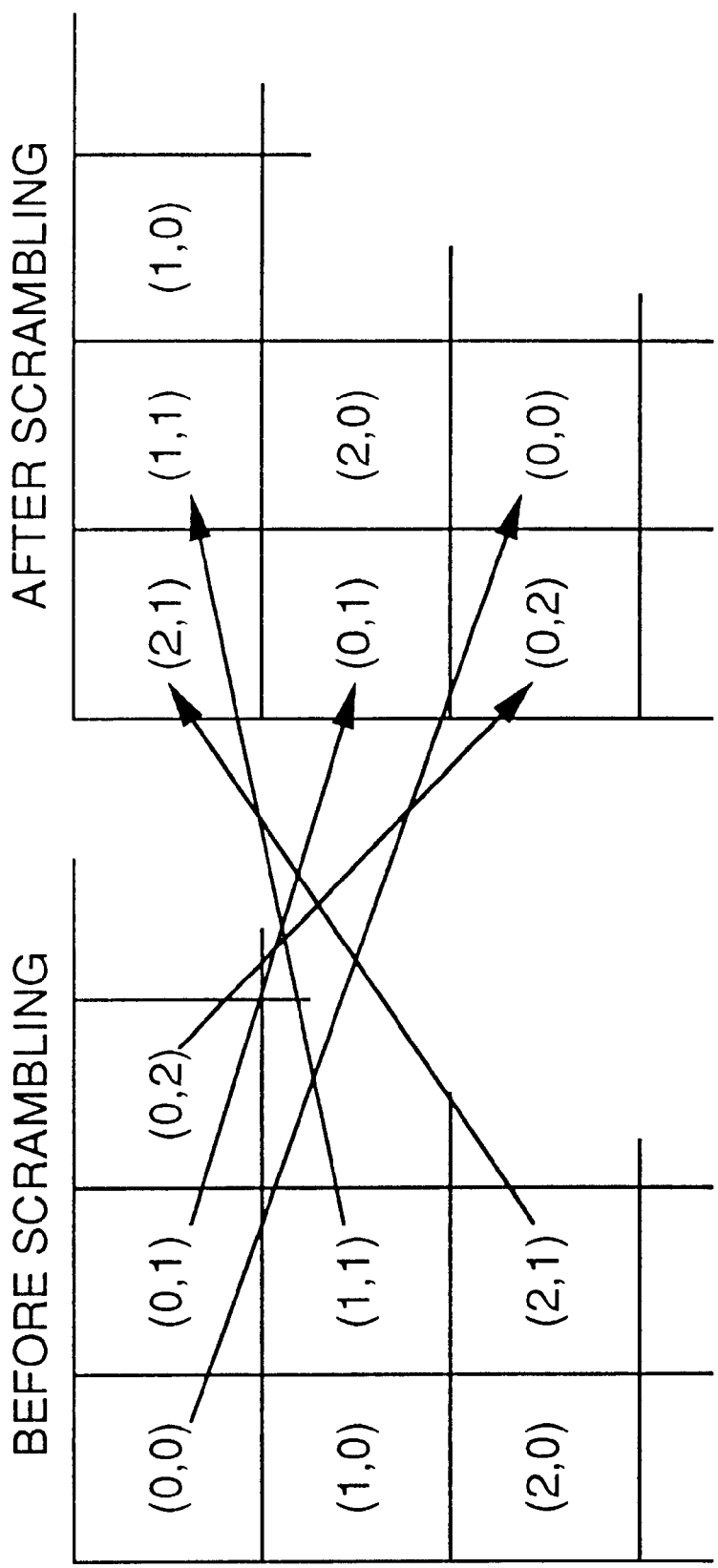
FIG. 8 illustrates an example of the original MPEG image data stream and the scrambled data stream scrambled by the first embodiment.

FIG. 8 illustrates an example of the arrangement of the macro blocks. The macro blocks are arranged in accordance with the arrangement information, and are respectively positioned at a position (p, q) different from their original position (x, y) in the image. That is, the arrangement information is the information regarding the relation between (x, y) and (p, q). When an MPEG decoder having no unscrambling function receives the above scrambled data stream, the MPEG decoder reproduces confused images, and users cannot use the images. However, because each of the macro blocks contained in the scrambled data stream complies with the MPEG standards, the scrambled data stream does not adversely affect the MPEG decoder, and it is possible to avoid the malfunction or failure of the MPEG decoder.

Although the macro block arrangement circuit 300a of this embodiment performs the arrangement processing for all pictures contained in the MPEG image data stream, it is also possible to perform the arrangement processing for a selected part of the pictures, for example, only one picture, contained in the MPEG image data stream. Even in such a case, the scrambling effects can be obtained.

The scrambled MPEG image data stream output by the arrangement circuit 300a may be transmitted directly to the MPEG stream decoder 100b, or may be stored in a suitable recording medium such as a CD-ROM, a DVD-ROM, a DVD-RAM, a memory, a floppy disk, a hard disk, or a magnetic tape.

In the receiver of the present embodiment, the MPEG stream decoder 100b receives the scrambled image data which is transferred directly from the transmitter or is read out from the data storing medium, the MPEG stream decoder 100b detects the top position of each of the macro blocks included in the scrambled data stream by decoding the scrambled data stream using a macro block as a unit, and outputs timing signals so as to synchronize with the data stream. The macro block rearrangement circuit 500a receives both the scrambled data stream and the timing signals, rearranges the data segments divided by the timing signal in accordance with the rearrangement information to reproduce the original MPEG image data stream. Furthermore, the MPEG decoder circuit 700 receives the MPEG image data stream output from the rearrangement circuit 500a, and reproduces the visible image data on a display device such as a display.

Figure 12:
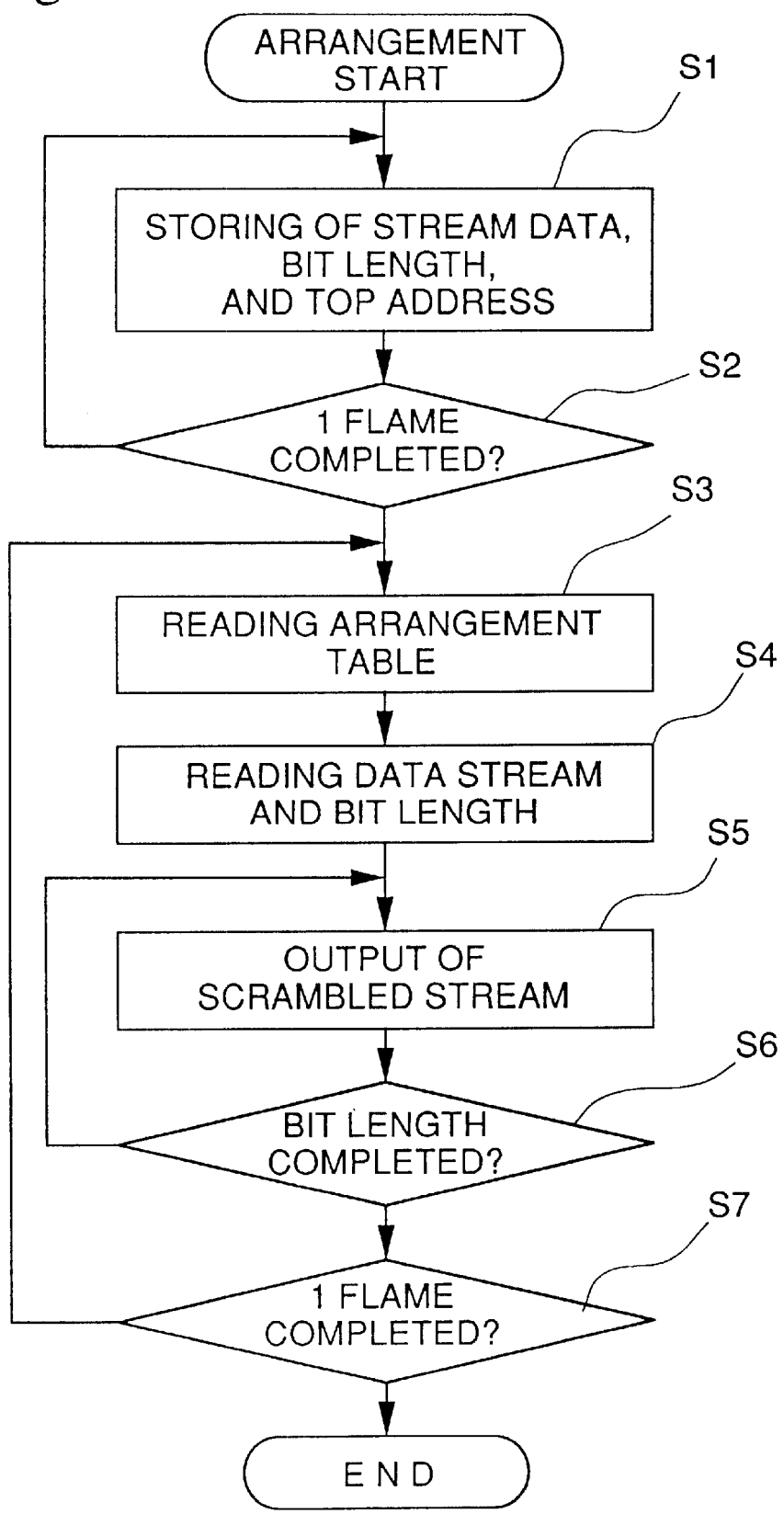
FIG. 12 is a flowchart of the arrangement process by the arrangement circuit shown in FIG. 11.

The details of the macro block rearrangement circuit 300a will be explained referring to FIGS. 11 and 12. FIG. 11 is a block diagram of the macro block rearrangement circuit 300a, and FIG. 12 is a flowchart of the process. In the following explanation, it is supposed that, every time the macro block arrangement circuit 300a finishes the arrangement of one frame of the MPEG image data stream, the circuit 300a receives an MPEG bit stream of the next frame.

As shown in FIG. 11, the macro block arrangement circuit 300a comprises; a stream memory 13 for storing an MPEG data stream output from the MPEG stream decoder 100a; a bit counter for counting the number of bits contained in each macro block after initializing the bit number to 1 when receiving the timing signal; a top-address/bit-number memory 12 for storing both the top address of each macro block in the stream memory 13 and the bit number of the same macro block in the order of receiving the macro blocks; and a CPU 14 for data processing among the elements 12, 13, and 200, etc. It is also possible to use, instead of the CPU 14, a sequential controller (or processor) having the same function as that of the CPU.

Next, referring to FIG. 12, the function of the macro block arrangement circuit 300a will be explained. In the step S1 of FIG. 12, the macro block arrangement circuit 300a initializes the bit number in the bit counter 11 to "1" when receiving from the MPEG stream decoder 100a the timing signal corresponding to the top position of the next macro block. Then, the bit counter 11 starts counting the bit number of the macro block in the MPEG image data stream, and simultaneously, the stream memory 13 starts storing the data of the same macro block. When the stream memory 13 finishes storing all the data of the macro block, the top-address/bit-number memory 12 stores the bit number of the macro block and the top address (AD2) of the macro block in the stream memory 13. The CPU 14 controls the writing of the data into these memories while using, as triggers, the timing signal indicating the top of the macro blocks.

In the next step S2, the CPU 14 determines whether the stream memory 13 has stored all data of one frame in the MPEG data stream, and if the decision is "NO", the macro block arrangement circuit 300a will repeat the step S1 in order to perform the above process for the next macro block in the MPEG data stream. If the decision in the step S2 is "YES", the macro block arrangement circuit 300a will perform the next step S3.

In the step S3, the CPU 14 reads out the arrangement information stored in the arrangement table 200. In the next step S4, the CPU 14 sequentially reads out both the top address of each macro block stored in the stream memory 13 and the bit number (length) of the macro block, from the top-address/bit-number memory 12, in the order that the corresponding data in the arrangement information were read out from the arrangement table 200.

In the next steps S5 and S6, the CPU 14 produces readout addresses (AD3) of the stream memory 13 based on the top addresses and the bit lengths of the macro blocks, and sequentially outputs the data of the macro blocks from the stream memory 13 in the order specified by the readout addresses (AD3). In the next step S7, the CPU 14 decides whether the all data is output from the stream memory 13, and if the decision is "YES", the arrangement process for one frame is finished. If the decision is "NO", the steps S3–S6 are repeated until the decision becomes "YES".

Next, the macro block rearrangement circuit 500a shown in FIG. 1 will be explained. The rearrangement circuit 500a comprises the same hardware as that of the arrangement circuit 300a except that the rearrangement table 210 (FIG. 1) is used instead of the arrangement table 200; therefore, the overlapping explanations are omitted.

Figure 13:
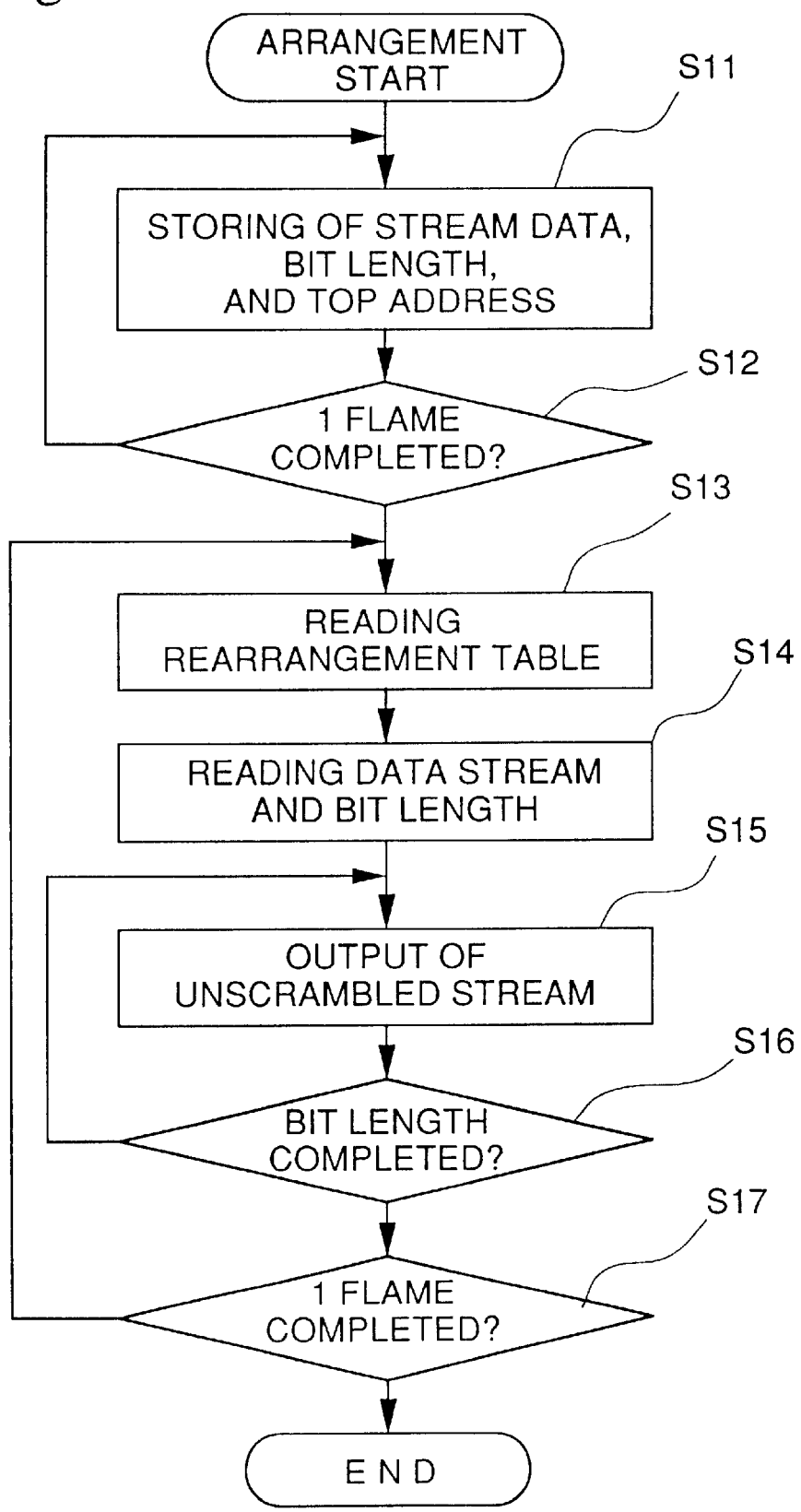
FIG. 13 is a flowchart of the rearrangement process by the rearrangement circuit.

FIG. 13 is a flowchart of the function of the rearrangement circuit 500a. In the step S11 of FIG. 13, the macro block rearrangement circuit 500a initializes the bit number in the bit counter 11 to "1" when receiving from the MPEG stream decoder 100b (FIG. 1) the timing signal corresponding to the top position of the next macro block. Then, the bit counter 11 starts counting the bit number of the macro block in the scrambled image data stream, and simultaneously, the stream memory 13 starts storing the data of the same macro block. When the stream memory 13 finishes storing all the data of the macro block, the top-address/bit-number memory 12 stores the bit number and the top address (AD2) of the macro block. The CPU 14 controls the writing of the data into these memories while using, as triggers, the timing signal indicating the top of the macro blocks.

In the next step S12, the CPU 14 determines whether the stream memory 13 has stored all the data of one frame in the scrambled data stream, and if the decision is "NO", the rearrangement circuit 500a will repeat the step S11 in order to perform the above process for the next macro block in the scrambled data stream. If the decision in the step S12 is "YES", the macro block rearrangement circuit 500a will perform the next step S13.

In the step S13, the CPU 14 reads out the rearrangement information stored in the rearrangement table 210. In the next step S14, the CPU 14 sequentially reads out both the top address and the bit number of the macro blocks, from the top-address/bit-number memory 12, in the order in which the corresponding data in the rearrangement information was read out from the rearrangement table 210.

In the next steps S15 and S16, the CPU 14 produces readout addresses (AD3) of the stream memory 13 based on the top addresses and the bit lengths of the macro blocks, and sequentially outputs the data of the macro blocks from the stream memory 13 in the order specified by the readout addresses (AD3). In the next step S17, the CPU 14 decides whether the all data is output from the stream memory 13, and if the decision is "YES", the rearrangement process for one frame is finished. If the decision is "NO", the steps S13–S16 are repeated until the decision becomes "YES".

[Second Embodiment]

Figure 2:
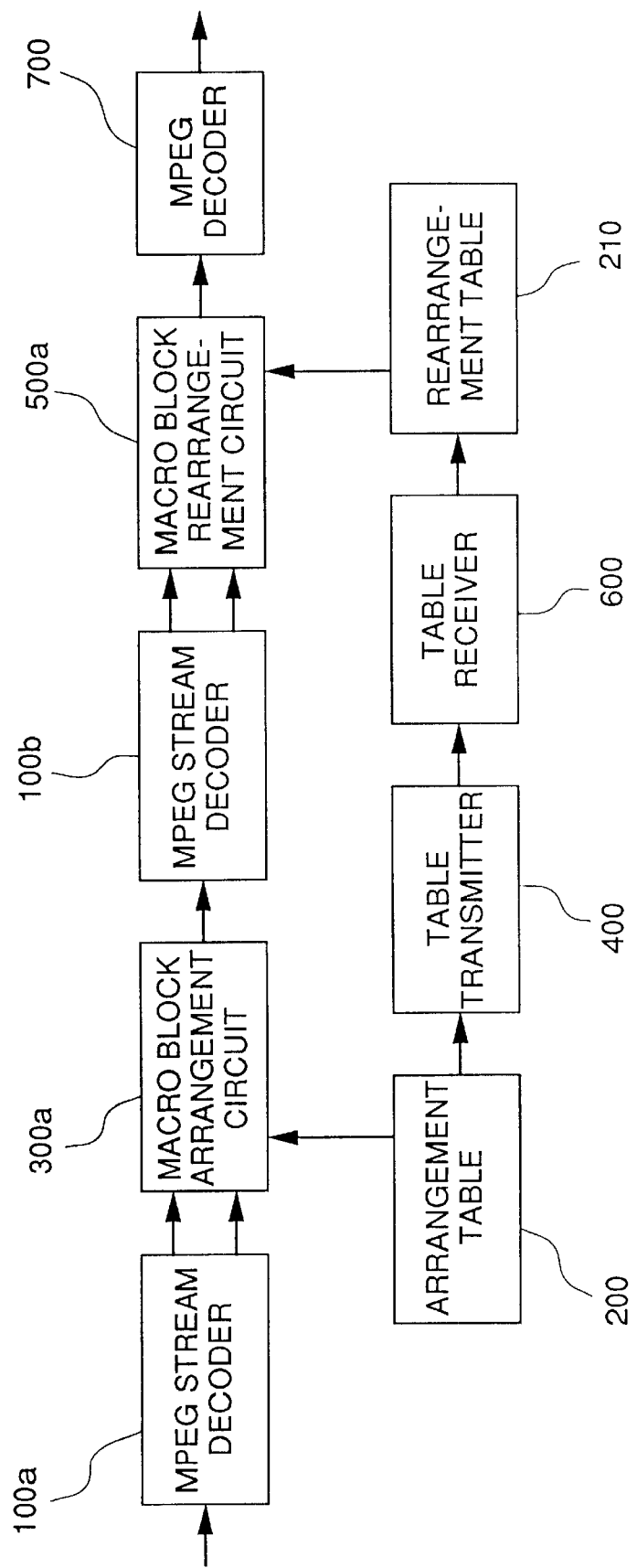
FIG. 2 is a block diagram of the image scrambling apparatus according to the second embodiment of the present invention.

The second embodiment of the present invention will be explained referring to FIGS. 2 and 10A–10C. As shown in FIG. 2, the second embodiment comprises, in addition to all the features of the first embodiment shown in FIG. 1, a table transmitter 400 for transmitting to the receiver side the arrangement information stored in the arrangement table 200, and a table receiver 600 for receiving the arrangement information, composing the rearrangement information from the received arrangement information, and storing the rearrangement information in the rearrangement table 210.

In this embodiment, the macro block arrangement circuit 300a outputs a scrambled MPEG image data stream as in the first embodiment, then, the table transmitter 400 transmits the arrangement information, which is used for the scrambling, to the table receiver 600. The arrangement information may be transmitted together with the scrambled data stream, or it may be transmitted separately from the scrambled data stream. The table receiver 600 receives the arrangement information, calculates the rearrangement information from the arrangement information, and stores the rearrangement information in the rearrangement table 210. In this embodiment, because it is not necessary to use fixed rearrangement information, the degree of freedom of the scrambling process can be improved.

After the rearrangement information is stored in the rearrangement table 210, as in the first embodiment, the macro block rearrangement circuit 500a receives the macro blocks divided by the MPEG stream decoder 100b, and rearranges the macro blocks according to the rearrangement information so as to output the unscrambled MPEG image data stream. Then, the MPEG decoder 700 reproduces the original image in a visible manner.

FIGS. 10A–10C respectively illustrate protocols which can be used between the table transmitter 400 and the table receiver 600.

In the first protocol shown in FIG. 10A, prior to transmitting the arrangement information, the table transmitter 400 transmits a transmitter start code to the table receiver 600, then, the table receiver 600 transmits an acknowledgment code to the table transmitter 400, and the table transmitter 400 starts transmitting the arrangement information to the table receiver 600 after receiving the acknowledgment code. The table receiver 600 develops data elements of the arrangement information on the rearrangement table 210 to produce the rearrangement information. It is also possible to compress or scramble the arrangement information before transmitting to the table receiver 600.

In the second protocol shown in FIG. 10B, the table transmitter 400 and the table receiver 600 respectively store a common set of arrangement tables respectively recording arrangement information different from each other, and each of the arrangement tables has a table number (or a table code), for example, one of the numbers from "1" to "K". In this case, the table transmitter 400 may transmit only the table number to the table receiver 600, instead of transmitting all data in the arrangement table. Then, the table receiver 600 selects the arrangement table having the received table number, and unscrambles the scrambled data stream using the selected arrangement table. Therefore, in comparison with the protocol of FIG. 10A, the amount of data to be transmitted can be considerably reduced.

In the next protocol shown in FIG. 10C, the table transmitter 400 outputs the arrangement information in the arrangement table or the table number of the selected arrangement table, and superimposes the data or the table number on the scrambled image data stream. In this case, after once instructing the start of the transmission, it is possible to transmit the arrangement information together with the scrambled image data stream. The superimposition method may be a method using video blanking signals, a method using MPEG system stream, or a method using electric watermarks embedded in the data stream.

Although various transfer protocols can be used in the present invention as stated above, it is preferable to transmit only the table number instead of transmitting the arrangement information or its compressed (or scrambled) data, because the amount of data can be reduced. Furthermore, if the arrangement tables and their numbers are concealed, because third parties cannot procure the rearrangement information from the table number, it is difficult for the third parties to unscramble the data stream.

[Third Embodiment]

Figure 3:
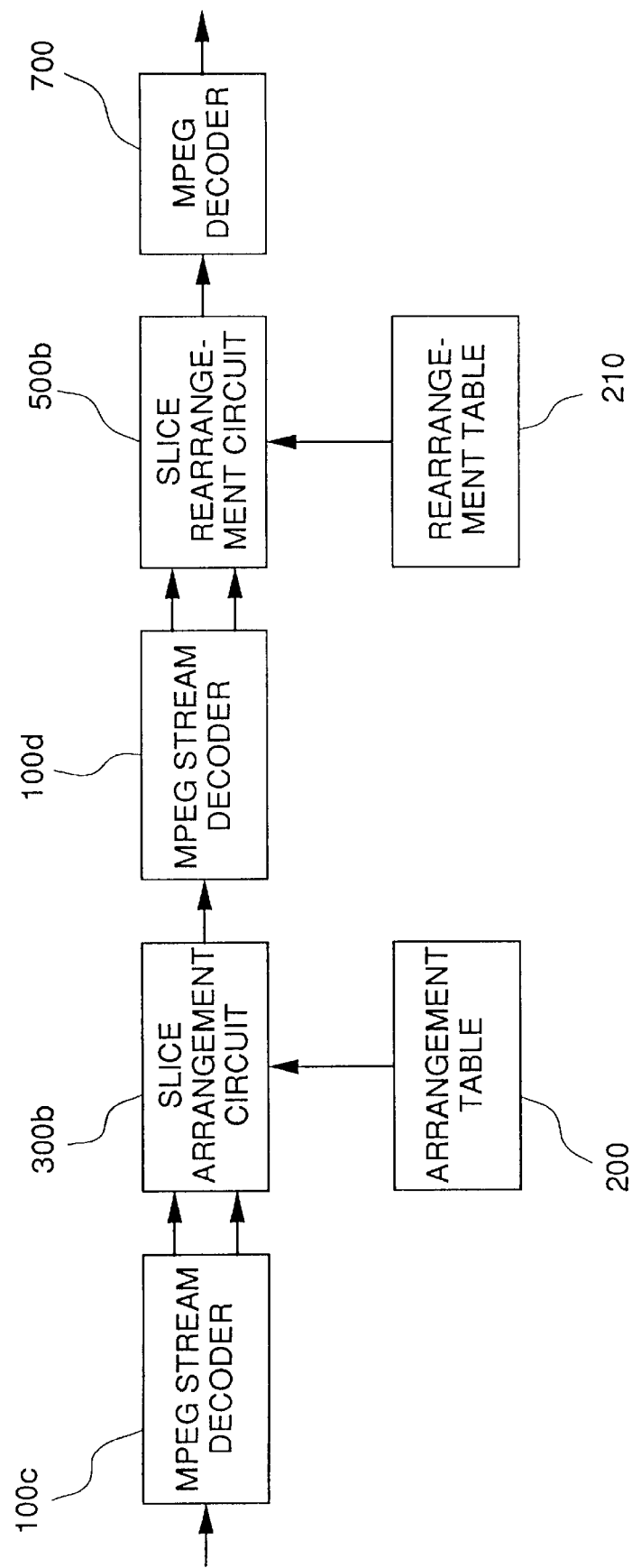
FIG. 3 is a block diagram of the image scrambling apparatus according to the third embodiment of the present invention.
Figure 7:
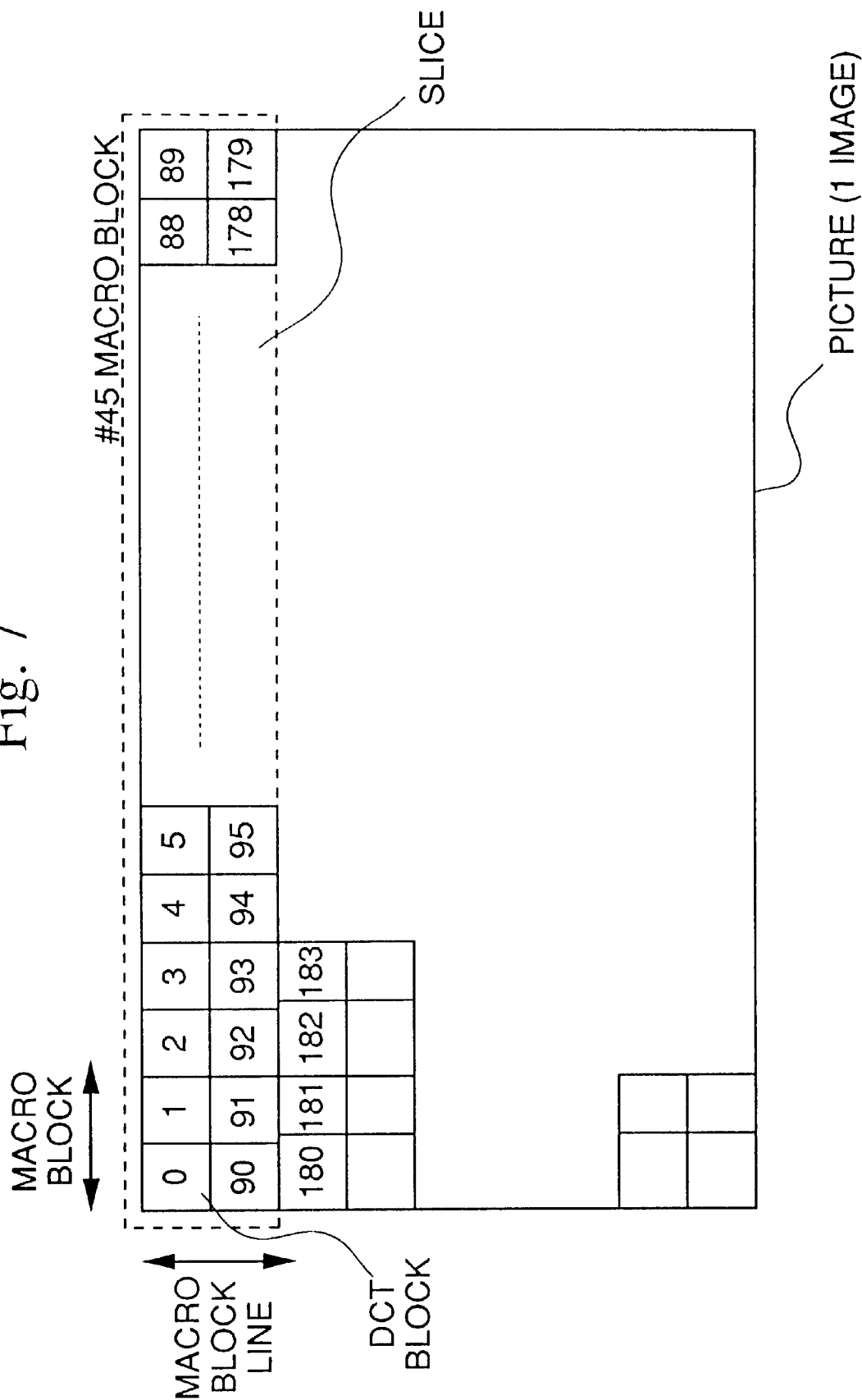
FIG. 7 illustrates the relation between a picture, slices, and macro blocks in an MPEG encoded image data stream.

FIG. 3 is a block diagram of the third embodiment of the present invention. In this embodiment, the MPEG image data stream is divided into slices, instead of being divided into macro blocks, and is scrambled by arranging the slices. A slice is a "macro block line" which consists of a plurality of macro blocks arranged in one line in a picture as shown in FIG. 7.

This apparatus consists of a transmitter (or a transmitting system) for scrambling an MPEG-encoded image data stream, and a receiver (or a receiving system) for unscrambling the scrambled image data stream.

The transmitter comprises an MPEG stream decoder 100c as a first dividing decoder for dividing an MPEG encoded image data stream into a plurality of macro block lines (=slices), an arrangement table 200 recording arrangement information to be used for arranging the slices, and a slice arrangement circuit 300b as an arrangement circuit for arranging the slices output from the MPEG stream decoder 100c in accordance with the arrangement information recorded in the arrangement table 200 to output a scrambled image data stream.

The receiver comprises an MPEG stream decoder 100d as a second dividing decoder for dividing the scrambled image data stream into a plurality of slices, a rearrangement table

210 recording rearrangement information to be used for rearranging the slices output from the MPEG stream decoder 100*d*, a slice rearrangement circuit 500*b* for rearranging the slices output from the MPEG stream decoder 100*d* in accordance with the rearrangement information recorded in the rearrangement table 210, and an MPEG decoder 700 for decoding the rearranged MPEG image data stream to reproduce the original image data.

Figure 9:
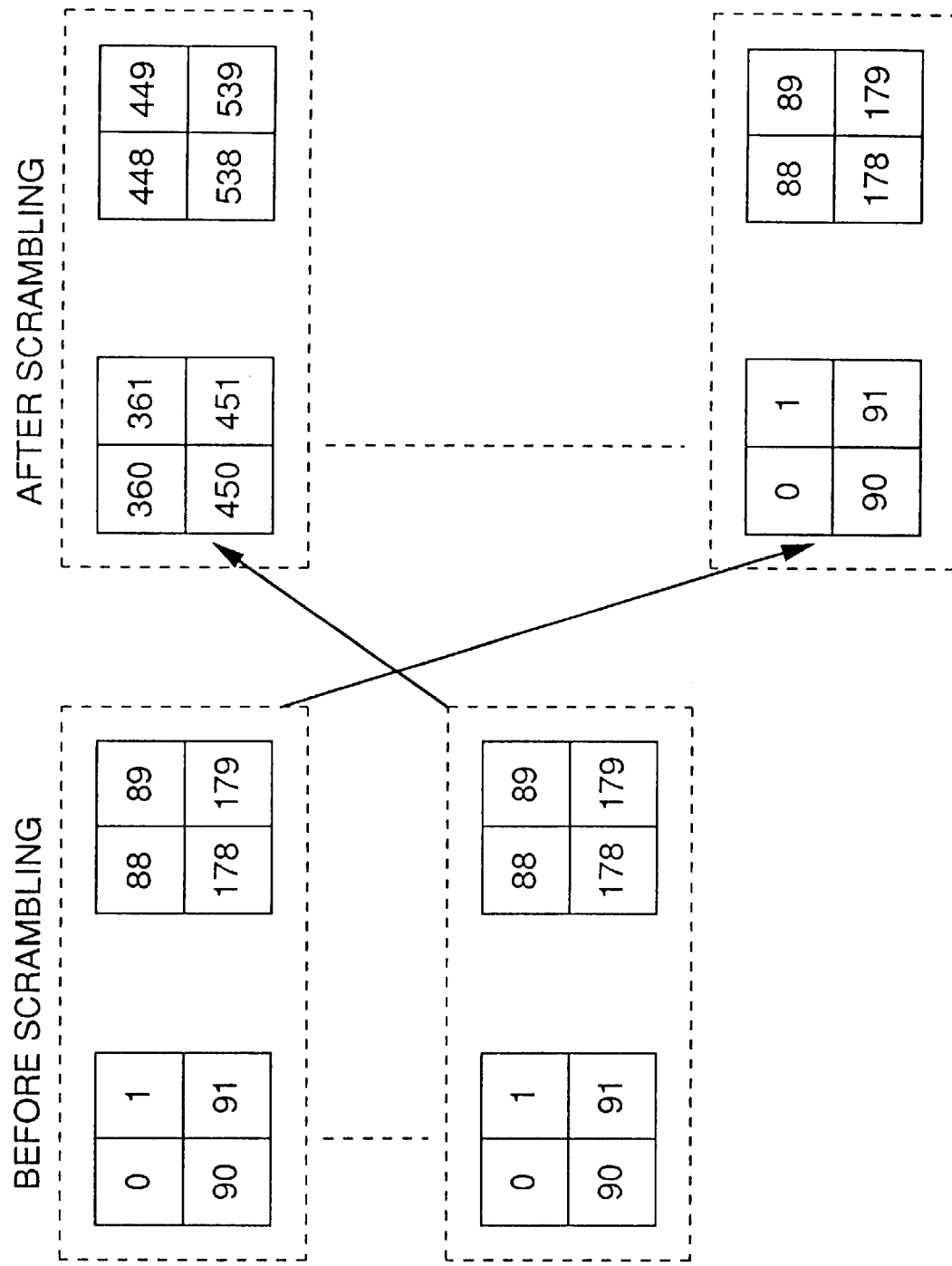
FIG. 9 illustrates an example of the original MPEG image data stream and the scrambled data stream scrambled by the third embodiment.

In the transmitter of this embodiment, the MPEG stream decoder 100*c* divides an MPEG encoded image data stream into a plurality of slices as shown in FIG. 7, and the slice arrangement circuit 300*b* arranges the slices in accordance with the arrangement information recorded in the arrangement table 200 to output a scrambled image data stream, as shown in FIG. 9. In the receiver, the MPEG stream decoder 100*d* divides again the scrambled image data stream into a plurality of slices, the slice rearrangement circuit 500*b* rearranges the slices in accordance with the rearrangement information recorded in the rearrangement table 210, and the MPEG decoder 700 decodes the rearranged MPEG image data stream to reproduce the original image data. The other constructions are the same as those of the first embodiment. That is, the slice arrangement circuit 300*b* and the slice rearrangement circuit 500*b* have the same functions as those of the macro block arrangement circuit 300*a* and the macro block rearrangement circuit 500*a* in the first embodiment, except for using slices in place of macro blocks. Therefore, duplicated explanations are omitted.

FIG. 6 illustrates the original MPEG image data stream and the scrambled image data stream. The slices illustrated in FIG. 6 have the same length as each other; however, the actual bit lengths may be different from each other. Because the scrambled image data stream consists of slices which satisfy the MPEG standards, if the scrambled image data is input directly into an MPEG decoder, there is no risk that the MPEG decoder will malfunction or fail. Nonetheless the MPEG decoder cannot replay the original image because of the scrambling.

[Fourth Embodiment]

Figure 4:
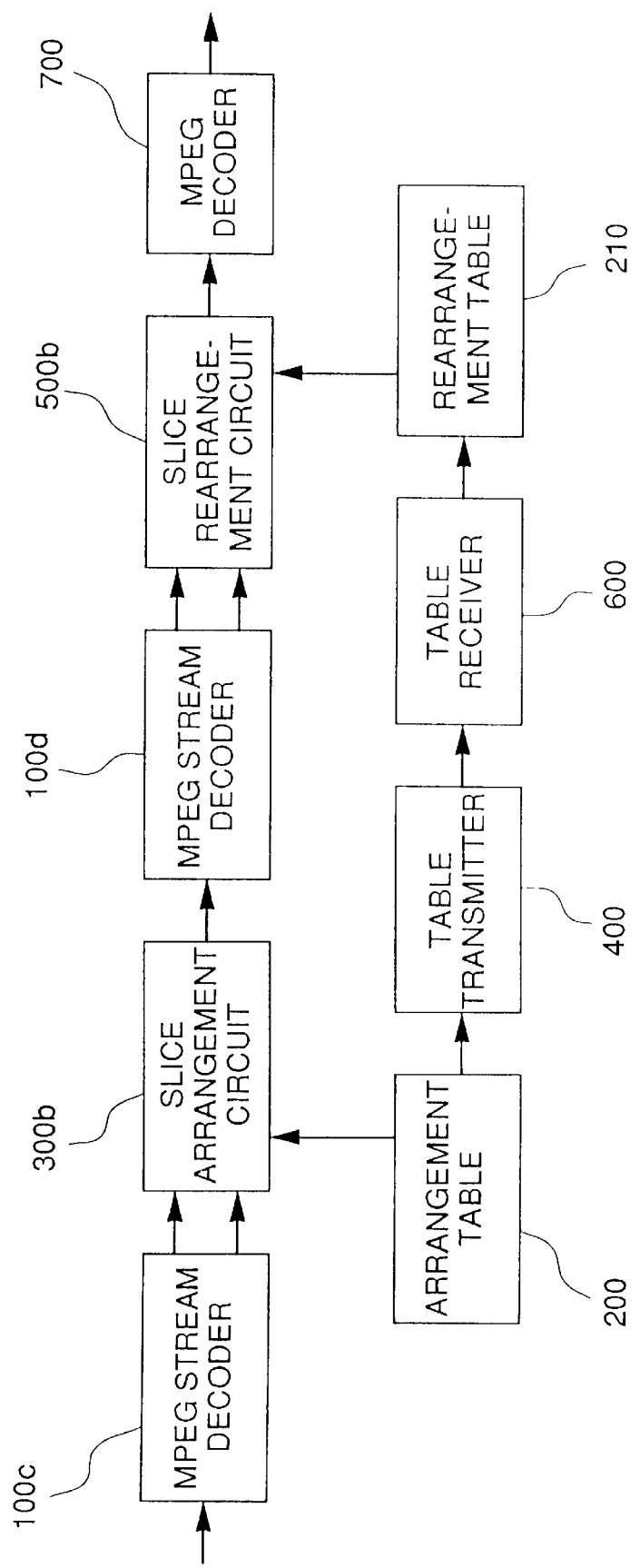
FIG. 4 is a block diagram of the image scrambling apparatus according to the fourth embodiment of the present invention.

FIG. 4 is a block diagram of the fourth embodiment of the present invention, and this embodiment comprises, in addition to the construction of the third embodiment shown in FIG. 3, a table transmitter 400 for transmitting to the receiver side the arrangement information stored in the arrangement table 200, and a table receiver 600 for receiving the arrangement information, composing the rearrangement information from the received arrangement information, and storing the rearrangement information in the rearrangement table 210.

In this embodiment, the slice arrangement circuit 300*b* outputs a scrambled MPEG image data stream as in the third embodiment, then, the table transmitter 400 transmits the arrangement information, which is used for the scrambling, to the table receiver 600. The arrangement information may be transmitted together with the scrambled data stream, or it may be transmitted as signals separate from the scrambled data stream. The table receiver 600 receives the arrangement information, calculates the rearrangement information from the arrangement information, and storing the rearrangement information in the rearrangement table 210. In this embodiment, because it is not necessary to fix the rearrangement information, the degree of freedom of the scrambling process can be improved in comparison with the third embodiment.

After the rearrangement information is stored in the rearrangement table 210, as in the third embodiment, the slice rearrangement circuit 500*b* receives the slices divided by the MPEG stream decoder 100*c* and rearranges the slices in according to the rearrangement information so as to output the unscrambled MPEG image data stream. Furthermore, the MPEG decoder 700 reproduces the original image in a visible manner.

In this embodiment, it is possible to use the protocols such as those explained referring to FIGS. 10A, 10B, and 10C.

Figure 14:
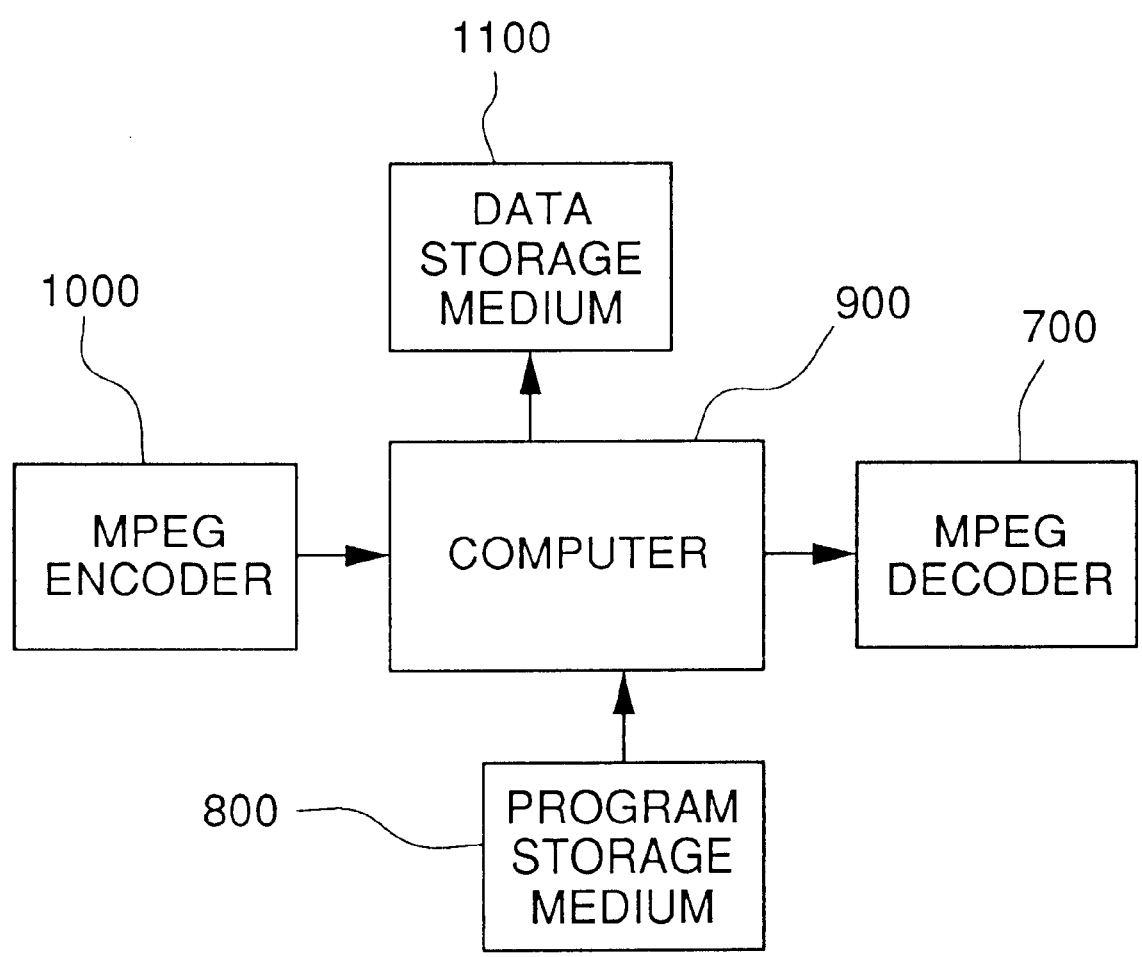
FIG. 14 is a block diagram showing a system which can be employed for the embodiments of the present invention.

FIG. 14 illustrates an example of the block diagram of the first and third embodiments in the case where computers are used. This example comprises an MPEG encoder 1000 for outputting an MPEG image data stream, a computer 900 for receiving the MPEG image data stream and performing the steps described in the first and third embodiments, a program storage medium 800 storing a program for performing the processes shown in FIGS. 12 and 13, a data storage medium for storing the scrambled data output from the transmitter (this may be the computer 900 or another device), and an MPEG decoder 700 for reproducing the original image data stream by decoding the MPEG image data stream unscrambled by the computer 900. The program storage medium 800 and the data storage means 1100 may be a CD-ROM, a CDR, a DVD, a floppy disk, a magnetic tape, a hard disk, or the like.

When this system is used as the transmitter of the first or third embodiment, the computer 900 loads a program for performing the processes shown in FIG. 12 and the arrangement table information from the program storage medium 800. Next, the computer 900 receives an MPEG encoded image data stream from the MPEG encoder 1000, scrambles the MPEG image data in accordance with the process shown in FIG. 12, and outputs the scrambled image data stream to store it in the data storage medium 1100, for example a CD-ROM.

When this system is used as the receiver of the first or third embodiment, the computer 900 loads a program for performing the processes shown in FIG. 13 and the rearrangement table information from the program storage medium 800. Next, the computer 900 receives a scrambled image data stream from the data storage medium 1100, unscrambles the scrambled image data in accordance with the process shown in FIG. 13, and outputs the original MPEG image data stream so as to replay it by the MPEG decoder 700. Instead of loading the rearrangement information form the program storage medium 800, it is also possible to load the rearrangement information from the data storage medium 1100 or another source.

The system shown in FIG. 14 can also be used for the second and fourth embodiments of the present invention. In these cases, the computer 900 further comprises the functions of the table transmitter 400 and the table receiver 600. That is, the computer 900 stores the arrangement information in the data storage medium 1100 when storing the scrambled image data in the data storage medium 1100, and the computer 900 produces the rearrangement information using the arrangement information stored in the data storage medium 1100 when replaying the scrambled image data stream. Of course, it is also possible for the computer to receive the arrangement information from other sources.

What is claimed is:

1. An image scrambling apparatus for scrambling and unscrambling of an MPEG encoded image data stream, comprising:

a first dividing decoder for dividing the MPEG encoded image data stream into a plurality of data segments;

at least one arrangement table recording arrangement information to be used for arranging the data segments;

an arrangement circuit for arranging the data segments output from the first dividing decoder in accordance with the information recorded in the arrangement table to output a scrambled image data stream;

a second dividing decoder for dividing the scrambled image data stream into a plurality of data segments;

at least one rearrangement table recording rearrangement information to be used for rearranging the data segments output from the second dividing decoder; and a rearrangement circuit for rearranging the data segments output from the second dividing decoder in accordance with the rearrangement information recorded in the rearrangement table.

2. The apparatus according to claim 1, wherein the first dividing decoder, the arrangement table, and the arrangement circuit are included in a transmitter, and the second dividing decoder, the rearrangement table, and the rearrangement circuit are included in a receiver.

3. The apparatus according to claim 1, wherein the first and second dividing decoder divide the data stream into macro blocks corresponding to the data segments.

4. The apparatus according to claim 1, wherein the first and second dividing decoder divide the data stream into slices corresponding to the data segments.

5. The apparatus according to claim 1, further comprising:

a table transmitter for transmitting the arrangement information recorded in the arrangement table; and a table receiver for receiving the arrangement information transmitted from the table transmitter, calculating the rearrangement information from the arrangement information, and recording the rearrangement information in the rearrangement table.

6. The apparatus according to claim 1, further comprising:

a plurality of the arrangement tables respectively recording arrangement information different from each other and having table numbers different from each other;

a table transmitter for transmitting the table number corresponding to the arrangement table to be used; and a table receiver for receiving the table number transmitted from the table transmitter, calculating the rearrangement information from the arrangement information recorded in the arrangement table corresponding to the received table number, and recording the rearrangement information in the rearrangement table.

7. An image scrambling method for scrambling an MPEG encoded image data stream, comprising the steps of:

providing an arrangement table recording arrangement information to be used;

dividing the MPEG encoded image data stream into a plurality of data segments; and arranging the data segments in accordance with the information recorded in the arrangement table to output a scrambled image data stream.

8. The method according to claim 7, wherein the data stream is divided into macro blocks corresponding to the data segments.

9. The method according to claim 7, wherein the data stream is divided into slices corresponding to the data segments.

10. An image unscrambling method for unscrambling an image data stream scrambled by the method of claim 7, comprising the steps of:

dividing the scrambled image data stream into a plurality of data segments;

providing a rearrangement table recording rearrangement information to be used for rearranging the data segments; and rearranging the data segments in accordance with the information recorded in the rearrangement table to output an unscrambled image data stream.

11. A computer-readable medium containing computer-readable instructions, comprising:

means for causing a computer to provide an arrangement table recording arrangement information to be used;

means for causing a computer to divide an MPEG encoded image data stream into a plurality of data segments; and means for causing a computer to arrange the data segments in accordance with the arrangement information recorded in the arrangement table to output a scrambled image data stream.

12. A computer-readable medium containing computer-readable instructions, comprising:

means for causing a computer to divide a scrambled image data stream into a plurality of data segments;

means for causing a computer to provide a rearrangement table recording rearrangement information to be used for rearranging the data segments; and means for causing a computer to rearrange the data segments in accordance with the rearrangement information recorded in the rearrangement table to output an unscrambled image data stream.

* * * * *